United States Patent Office 3,519,610
Patented July 7, 1970

3,519,610
POLYACRYLATE CURING AGENTS
Elwood E. Huntzinger, Springfield, Pa., assignor to Air Products and Chemicals, Inc., Philadelphia, Pa., a corporation of Delaware
No Drawing. Filed Nov. 18, 1966, Ser. No. 595,329
Int. Cl. C08f 3/64
U.S. Cl. 260—89.5　　　　　　　　　　　　　6 Claims

ABSTRACT OF THE DISCLOSURE

Polyacrylate elastomeric compositions are prepared by using as a curing agent a salt obtained by combining triethylenediamine or its methyl form with an acidic organic compound, such as a phenolic compound. The salt is used in about 3 to 12 parts per 100 parts of resin; and the vulcanization conditions range from 290° F. to 425° F. for 3 to 30 minutes. The system has good bin stability and the vulcanizate has good compression set value without resorting to post cure tempering.

---

The present invention relates to curing agents for polyacrylate elastomers and more particularly, to the use of salts of triethylenediamine-type amines and certain acidic organic compounds as curing agents for non-chlorine containing polyacrylate elastomers.

Polyacrylate elastomers have found wide acceptance in such applications as O-rings, gaskets and seals for three basic reasons: (1) excellent resistance to heat; (2) resistance to hot lubricants and (3) resistance to compression set at high temperature.

Two steps are normally involved in processing such elastomers. The first step is the mastication of the polyacrylate with fillers, processing aids, antioxidants, etc.; the second step is the actual cure (vulcanization), usually in a heated form or a mold. An ideal cure system for accomplishing this second step has been defined as one which gives long bin stability of the fully mixed ingredients and does not corrode ordinary steel molds—in addition to providing adequate cured properties. A particular desideratum for curing systems is mold curing at standard time and curing temperatures which will give required compression set resistance without post curing. Because of the difficulty in corrosivity arising out of the presence of chlorine in some polyacrylates this invention relates to polyacrylate elastomers substantially free of chlorine.

In many respects, triethylenediamine, [1,4,-diazabicyclo-(2.2.2-octane], approaches the defined ideal curing system for non-chlorine containing polyacrylate elastomers. Similar, although not necessarily identical results are obtained with methyl triethylenediamine, [2-methyl-1,4-diazabicyclo-(2.2.2.)-octane], as the curing system. Compared with control compounds cured with curing agents specifically recommended for such elastomers (e.g., ammonium benzoate), compounds cured with triethylenediamine are fast curing, have generally better physical properties (e.g., reduced oil swelling) and better aging characteristics (e.g., improved heat aging in air resulting in better retention of tensile strength and elongation). Most importantly, elastomers cured with triethylenediamine do not require tempering (post curing) to achieve minimum compression set values. Triethylenediamine cured non-chlorine containing polyacrylate elastomers, however, are somewhat deficient in bin stability when compared with ammonium benzoate curing systems. Better room temperature storage stability (i.e., bin stability) is reflected in a Mooney minimum viscosity and a Mooney scorch time (ASTM D–1646) relatively unchanged during storage.

It has now been discovered that materially enhanced curing systems for non-chlorine containing polyacrylate elastomers can be obtained with the desirable attributes of long bin stability, adequate scorch value, noncorrosivity and the provision of adequate properties in the cured elastomers. Such curing systems incorporate and substantially retain the beneficial and desirable properties of triethylenediamine, or its methyl form, while adding thereto enhanced properties of long bin stability as evidenced through better Mooney minimum viscosity and scorch values.

In accordance with this invention improved polyacrylate elastomer cure systems are prepared by combining triethylenediamine or methyl triethylenediamine with an acidic, oxygen-containing organic compound characterized in forming with the amine a salt which, in the presence of a polyacrylate to be cured has little to no activity in promoting polyacrylate curing at room temperature conditions and which at curing conditions promotes curing of the type and degree equivalent to about that of the amine alone at equivalent cure conditions.

The amine addition salts are readily formed by room temperature admixture of the amine with the acidic compound, the acidic compound being a phenol or a carboxylic acid.

Examples of suitable acidic, oxygen-containing organic compounds include phenol and substituted phenols with mono- di- or tri-substitution with alkyl groups having up to eighteen carbon atoms. While some stronger organic acids do not meet the requirement of releasing the effective amine curative properties, e.g. at temperatures of cure up to about 425° F., certain carboxylic compounds are suitable. However, the phenolics are preferred generally.

Typical phenolic compounds coming within the purview of this invention include dinonyl phenol, ditertiary amyl phenol, isopropyl phenol, and particularly various cresols of the meta-, ortho- or para-cresol variety, such as: 2,5-ditertiary - butyl-meta - cresol; 2,6-ditertiary-butyl-meta-cresol; 4,6-ditertiary - butyl - meta - cresol; 3,6-ditertiary-butyl - ortho - cresol; 4,6-ditertiary - butyl - ortho-cresol; 2,5 - ditertiary - butyl - para - cresol; and 3,5 - ditertiary-butyl-para-cresol. A particularly effective cresol is 2,6-ditertiary-butyl-para-cresol.

The resulting salt of triethylenediamine or methyl triethylenediamine may be employed in an amount between 3 and 12 parts and preferably between 4 and 7 parts per hundred parts of the non-chlorine containing polyacrylate elastomers. Within these ranges, excellent bin stability is obtained while maintaining wide latitude in the curing cycle. Normally, such mold curing is effected at about 290° F. to 410° F. for about 3 to 30 minutes; the shorter the time, the higher the temperature required. In any event, the product from such mold curing has compression set characteristics at least meeting minimum requirements and generally approaching the quality obtained by post curing.

Typical antioxidants, fillers, bonding agents, modifiers, etc. may be employed with the curing system in known manner. For example, antioxidants, such as the low temperature reaction product of diphenylamine and acetone, are employed to achieve a maximum level of heat resistance. Most furnace blacks provide good reinforcement for such elastomers. Modifiers, such as red lead, may be used to prevent pock markings, increase the cure rate and improve tensile properties.

The invention is clarified more fully by the following illustrative embodiments:

EXAMPLE I

Three tested cure systems shown in Table 1 were mill mixed into appropriate portions of the following masterbatch:

30 day storage test scorch time decreased 18% with the monotriethylenediamine salt, 13% with ammonium benzoate and 50% with triethylenediamine.

In addition to bin stability and advantageous vulcanizate physical properties of the triethylenediamine-DBPC curing system described above, the triethylenediamine salt curing system avoids objectionable odors and fumes associated with the use of ammonium benzoate curing system.

EXAMPLE II

Employing the same masterbatch as in Example I, the following series of triethylenediamine salts were evaluated at a triethylenediamine equivalent of 2.0 phr. (parts per hundred by weight of rubber).

TABLE 1

| Curing System | Mooney Minimum Viscosity | Mooney Scorch 250° F. (Large Rotor) | | Tensile strength, p.s.i. | | Elong., Percent | |
|---|---|---|---|---|---|---|---|
| | | T-5, Min. | T-35, Min. | NT[1] | T[2] | NT[1] | T[2] |
| (A) Triethylenediamine, 2.0 phr | 51 | 14.6 | 23.3 | 1,650 | 2,000 | 410 | 325 |
| (B) Triethylenediamine-2,6-ditertiary-butyl-para-cresol, 5.9 phr. (1–1 mol ratio) | 42 | 18.1 | 28.9 | 1,525 | 1,920 | 450 | 325 |
| (C) Ammonium Benzoate, 4.0 phr | 42 | 14.8 | 22.7 | 1,645 | 1,880 | 400 | 275 |

| Curing System | Modulus | | | Shore A Hardness | | Compression Set 70 hr. at 300° F. (ASTM D-395 meth. B) | |
|---|---|---|---|---|---|---|---|
| | Percent | P.s.i. | | | | | |
| | | NT[1] | T[2] | NT[1] | T[2] | NT[1] | T[2] |
| (A) | 100 | 245 | 350 | 57 | 64 | 40 | 37 |
| | 200 | 845 | 1,185 | | | | |
| | 300 | 1,380 | 1,940 | | | | |
| (B) | 100 | 220 | 320 | 55 | 61 | 42 | 41 |
| | 200 | 700 | 1,120 | | | | |
| | 300 | 1,220 | 1,880 | | | | |
| (C) | 100 | 232 | 345 | 64 | 75 | 53 | 34 |
| | 200 | 755 | 1,305 | | | | |
| | 300 | 1,380 | | | | | |

[1] NT—Not tempered, press cured 30 min. at 310° F.
[2] T—Press cured 30 min. at 310° F. and oven tempered 24 hr. at 300° F.

| | PBW |
|---|---|
| Polyacrylate (Thiacril 76—characterized by a white opaque color and a specific gravity 25°/25° C. of approximately 1.09) | 100 |
| Furnace black (FEF) | 40 |
| Stearic acid | 1 |
| Polymerized trimethyl dihydroquinoline (Agerite Resin D) | 1.5 |

As seen from the above table, the triethylenediamine salt, which was prepared by reacting one mol of 2,6-ditertiarybutyl-para-cresol (DBPC) with one mol of triethylenediamine, shows a marked improvement in Mooney minimum viscosity and scorch time over triethylenediamine cured stock without any significant sacrifice in vulcanizate physical properties.

In comparison with a commercial curing system, ammonium benzoate, the aforementioned triethylenediamine salt curing system has substantially the same order of bin stability as shown in Table 2, below.

TABLE 2

| Curing System | Bin Stability (Mooney Scorch, T-5, Min. at 310° F.) Large Rotor | |
|---|---|---|
| | Initial | Aged, 30 Days |
| (A) Triethylenediamine, 2.0 phr | 3.6 | 1.8 |
| (B) Triethylenediamine plus DBPC, 5.9 phr (1–1 mol ratio) | 3.9 | 3.2 |
| (C) Ammonium Benzoate, 4.0 phr | 3.9 | 3.4 |

Based on the test in Table 2, it is seen that bin stability for the mono-triethylenediamine salt is similar to that attainable with ammonium benzoate. For example, the

TABLE 3

| Curing System | Mooney Scorch | |
|---|---|---|
| | 310° F. Initial | 30 Day |
| (D) Triethylenediamine, 2.0 phr.: | | |
| Min. Vis | 45 | 75 |
| T-5 | 3.6 | 1.8 |
| T-30 | 4.7 | 2.5 |
| T-35 | 4.8 | 2.7 |
| (E) Triethylenediamine-DBPC (1–1 mol ratio) 5.9 phr.: | | |
| Min Vis | 38 | 47 |
| T-5 | 3.9 | 3.2 |
| T-30 | 5.5 | 4.0 |
| T-35 | 5.7 | 4.2 |
| (F) Triethylenediamine-Neodecanoate, (1–1 mol ratio) 5.3 phr.: | | |
| Min. Vis | 34 | 34 |
| T-5 | 8.6 | 6.9 |
| T-30 | 11.6 | 10.4 |
| T-35 | 12.0 | 10.7 |
| (G) Triethylenediamine-Azelate, (1–1 mol ratio) 5.3 phr.: | | |
| Min. Vis | 60 | |
| T-5 | 3.6 | |
| T-30 | 7.3 | |
| T-35 | 9.0 | |
| (H) Triethylenediamine-Benzoate, (1–1 mol ratio) 4.2 phr | | |
| Min Vis | 41 | |
| T-5 | 13.5 | |
| T-30 | 19.4 | |
| T-35 | 20.7 | |
| (I) Triethylenediamine-Dibenzoate, (1–2 mol ratio) 6.4 phr.: | | |
| Min. Vis | 94 | |
| T-5 | >30 | |
| T-30 | | |
| T-35 | | |
| (J) Triethylenediamine-Diformate, (1–2 mol ratio) 3.6 phr.: | | |
| Min. Vis | 72 | |
| T-5 | >30 | |
| T-30 | | |
| T-35 | | |

The vulcanizate properties of the samples prepared with Curing Systems (D) to (G), above, are shown in the similarly identified tabulation continued below.

TABLE 3a

| | Modulus, p.s.i. | | | Shore A Hardness[2] | | Tensile Strength, p.s.i. | | Elongation, percent | | Compression Set, 70 hr. at 300° F. Plied Specimen | |
|---|---|---|---|---|---|---|---|---|---|---|---|
| | Percent | NT[1] | T[2] | NT[1] | T[2] | NT[1] | T[2] | NT[1] | T[2] | NT[1] | T[2] |
| (D) | 100 | 245 | 350 | | | | | | | | |
| | 200 | 845 | 1,185 | 57 | 64 | 1,650 | 2,000 | 410 | 325 | 40 | 37 |
| | 300 | 1,380 | 1,940 | | | | | | | | |
| (E) | 100 | 220 | 320 | | | | | | | | |
| | 200 | 700 | 1,120 | 55 | 61 | 1,525 | 1,920 | 450 | 325 | 42 | 41 |
| | 300 | 1,220 | 1,880 | | | | | | | | |
| (F) | 100 | 105 | 220 | | | | | | | | |
| | 200 | 175 | 775 | 55 | 62 | 810 | 1,730 | 925 | 400 | 85 | 64 |
| | 300 | 275 | 1,420 | | | | | | | | |
| (G) | 100 | 140 | 435 | | | | | | | | |
| | 200 | 300 | 1,480 | 61 | 66 | 1,280 | 1,990 | 775 | 280 | 80 | 51 |

[1] NT=Not tempered, press cured 30 min. at 310° F.
[2] T=Press cured 30 min. at 310° F. and tempered 24 hr. at 300° F. in an oven.

As seen in Tables 3 and 3a above, salts in which both triethylenediamine nitrogens were blocked by relatively strong acidic compounds (two mols per mol of triethylenediamine) were found to be essentially inactive. (As shown in Table 6, below, salts in which both nitrogens are blocked by relatively weak acids such as phenols, are shown to be activatable at normal curing conditions.) Of the mono-acid salts (one mol of acid per mol of triethylenediamine) tested, the benzoate was very slow curing (based on the Mooney Test) and was not tested further. The neodecanoate and azelate salts were slower curing than triethylenediamine and vulcanizate physical properties were generally inferior. The DBPC-triethylenediamine salt on the other hand, was only slightly slower curing than triethylenediamine alone and produced vulcanizate physical properties close to those attainable with triethylenediamine. Furthermore, a marked improvement in bin stability, as measured with the Mooney viscosimeter, was observed. In general, among the mono- and dicarboxylic acids it is preferred to employ the weaker acids—i.e. those having a $pK_a$ value above 5—in a molar ratio of 0.5 to 1.0 per mol of triethyelnediamine. The stronger acids, such as formic and acetic which have $pK_a$ values below 5, do not have the desired level of activity even at 1:1 mol ratio.

EXAMPLE III

In an independent series of tests with a masterbatch mix similar to that of Example I the relative effectiveness of triethylenediamine, the monosalt of triethylenediamine and ditertiary butycresol and the monosalt of triethylenediamine and dinonyl phenol were compared as cure system. The data are presented in Table 4 below.

TABLE 4

| | Tens. Str., p.s.i. | Elong., percent | 200% Modulus, p.s.i. | Shore A Hardness | Compression Set, 70 hr. at 300° F |
|---|---|---|---|---|---|
| Triethylenediamine, 2.0 phr.: | | | | | |
| NT[1] | 2,000 | 300 | 1,250 | 56 | 37 |
| T[2] | 1,980 | 250 | 1,475 | 59 | 44 |
| Triethylenediameditertiarybutyl cresol (1-1 per mol ratio) 5.9 phr.: | | | | | |
| NT[1] | 1,880 | 310 | 1,170 | 53 | 42 |
| T[2] | 1,870 | 250 | 1,430 | 57 | 41 |
| Triethylenediaminedinonyl phenol (1-1 per mol ratio) 8.1 phr.: | | | | | |
| NT[1] | 1,430 | 375 | 670 | 47 | 69 |
| T[2] | 1,740 | 280 | 1,070 | 55 | 61 |

[1] NT=Press cured 7 minutes at 390° F.
[2] T=Press cured 7 minutes at 390° F. and oven Post Cured 5 hours at 350° F.

The salt from the dinonyl phenol is effective in giving a practical level of curing performance.

The bin stability exhibited by these curing agents is shown in Table 5 below.

TABLE 5

| | Bin Stability (Mooney Scorch T-5 Min.) at 310° F. | | | |
|---|---|---|---|---|
| Curative | Initial | Aged[1] 7 days | Aged[1] 14 days | Aged[1] 30 days |
| Triethylenediamine, 2.0 phr | 3.6 | 1.9 | | 1.8 |
| Methyl-triethylene diamine | 5.3 | [2] 3.7 | | 2.1 |
| Triethylenediamine ditertiary butyl-cresol (1-0.5 mol ratio) 4.0 phr. | 3.3 | 2.5 | 1.8 | |
| Triethylenediamine-ditertiary butyl-cresol (1-1 mol ratio) 5.9 phr | 3.9 | 3.0 | | 3.2 |
| Triethylenediamine-dinonyl phenol (1-1 mol ratio) 8.1 phr | 3.6 | [3] 3.6 | | |

[1] Aged at room temperature for the indicated time periods.
[2] 8 days. [3] 9 days.

A definite extended pot life is evidenced in the data immediately above when a salt of the present invention is employed.

EXAMPLE IV

A masterbatch of polyacrylate rubber had the following formula

| | Parts |
|---|---|
| Polyacrylate (Thiacril 76) | 100 |
| Furnace black (Philblack A) | 60 |
| Stearic acid | 1 |
| Agerite Resin D | 1.5 |

This material was employed with the cure systems identified in Table 6 below.

TABLE 6

| Cure System | Methyl-triethylene-diamine | Triethylene-diamine plus (1 mol) ditert. butyl cresol | Methyl-triethylene-diamine plus (2 mol) ditert. butyl cresol | Triethylene-diamine plus phenol |
|---|---|---|---|---|
| Quantity, phr | 2.5 | 6.0 | 9.0 | 3.7 |
| Mooney Scorch: | | | | |
| T-5 | 2 | 2½ | 2¾ | 2 |
| T-10 | 2¼ | 2¾ | 3¼ | 2¼ |
| At 350° F., Minimum Viscosity | 26 | 23 | 18 | 27 |
| 5 Min. Cure at 400° F.: | | | | |
| Tensile, p.s.i | 1,835 | 2,040 | 1,635 | 2,100 |
| Elongation, percent | 330 | 305 | 400 | 305 |
| Shore A | 55 | 52 | 48 | 54 |
| C-set (22 hrs. at 302° F.) | 60 | 43 | 62 | 59 |
| 5 Min. Cure at 400° F., Tempered 5 hrs. at 350° F.: | | | | |
| Tensile p.s.i | 2,025 | 2,230 | 1,950 | 2,195 |
| Elongation, percent | 250 | 240 | 290 | 220 |
| Shore A | 59 | 56 | 57 | 58 |
| C-set: | | | | |
| 22 hrs. at 302° F | 41 | 37 | 39 | 35 |
| 70 hrs. at 302° F | 69 | 59 | 70 | 65 |

The above described cure systems comprising the salts of this invention have desirable extended pot life and impart desirable properties to the cured material.

Obviously, many modifications and variations of the invention as hereinbefore set forth may be made without departing from the spirit and scope thereof, and therefore, only such limitations should be imposed as are defined in the appended claims.

What is claimed is:

1. Curable non-chlorine containing polyacrylate compositions having extended bin stability and capable of being vulcanized to obtain cured polyacrylate elastomers having improved non-tempered compression set characteristics, said compositions comprising as curing agent therein in an amount between 3 and 12 parts of curing agent per hundred parts of curable polyacrylate the addition salt of a tertiary amine with an acidic oxygen-containing organic compound, said agent being selected from the group consisting of
   (a) mono- and di-addition salts of triethylenediamine and of methyl triethylenediamine with phenols and alkyl phenols having mono-, di-, or tri-substitution with alkyl groups of up to eighteen carbon atoms, and
   (b) mono-addition salts of triethylenediamine and of methyl triethylenediamine with mono- and dicarboxylic acids which acids have a $pK_a$ value above 5.

2. Composition as defined in claim 1 wherein said addition salt is one formed by reaction of the tertiary amine with a dialkylated cresol.

3. Composition as defined in claim 2 wherein said dialkylated cresol is 2,6-ditertiary-butyl-para-cresol.

4. The cure system in accordance with claim 3 wherein said 2,6-ditertiary-butyl-para-cresol has been combined on an equimolar basis with triethylenediamine to form said salt.

5. A process for curing a curable non-chlorine containing polyacrylate composition to a cured polyacrylate elastomer which comprises mixing such a composition on the basis of 100 parts of curable polyacrylate with 3 to 12 parts of a mono-salt of triethylenediamine and 2,6-ditertiary-butyl-para-cresol, and vulcanizing the resulting mixture at a temperature in the range of 290° F. to 410° F. for a time in the range of 3 to 30 minutes in an inverse relation to the temperature.

6. A process in accordance with claim 5 wherein said mono-salt is employed in an amount in the range of 4 to 7 parts per 100 parts of curable polyacrylate.

References Cited

UNITED STATES PATENTS 2,579,492   12/1951   Hansen et al.

HARRY WONG, JR., Primary Examiner

U.S. Cl. X.R.

260—41, 47